(12) United States Patent
Cripe

(10) Patent No.: US 12,517,188 B2
(45) Date of Patent: Jan. 6, 2026

(54) SYSTEM AND METHOD FOR NULLING AMBIENT MAGNETIC FIELDS IN A MAGNETIC SENSOR

(71) Applicant: Rockwell Collins, Inc., Cedar Rapids, IA (US)

(72) Inventor: David W. Cripe, Mount Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 154 days.

(21) Appl. No.: 18/442,546

(22) Filed: Feb. 15, 2024

(65) Prior Publication Data

US 2025/0264553 A1 Aug. 21, 2025

(51) Int. Cl.
*G01R 33/00* (2006.01)
*G01R 33/09* (2006.01)
(52) U.S. Cl.
CPC ......... *G01R 33/0029* (2013.01); *G01R 33/09* (2013.01)
(58) Field of Classification Search
CPC ............................ G01R 33/0029; G01R 33/09
See application file for complete search history.

(56) References Cited

U.S. PATENT DOCUMENTS

| | | | |
|---|---|---|---|
| 1,128,851 A | 2/1915 | Louis | |
| 9,030,197 B1 | 5/2015 | Meske et al. | |
| 9,759,785 B2 | 9/2017 | Uchiyama et al. | |
| 9,835,696 B2 | 12/2017 | Dieny et al. | |
| 10,591,320 B2 | 3/2020 | Marauska et al. | |
| 11,776,736 B2 | 10/2023 | Montoya et al. | |
| 2010/0060472 A1* | 3/2010 | Kimura | A61B 5/06 340/686.1 |
| 2022/0393554 A1 | 12/2022 | Binder et al. | |

* cited by examiner

*Primary Examiner* — Alesa Allgood
(74) *Attorney, Agent, or Firm* — Suiter Swantz IP

(57) ABSTRACT

A system for nulling ambient magnetic fields is disclosed. The system includes a magnetic sensor for detecting an ambient magnetic field, one or more magnetic structures positioned proximate to the magnetic sensor, and a controller. The controller includes one or more processors and is configured to receive a signal from the magnetic sensor, the signal associated with a strength value of the detected magnetic field; compare the strength value to a linear range associated with the magnetic sensor; generate an error signal, via an integrating amplifier, in response to the signal approaching one or more extreme values within the linear range; generate a pulsed current based on the error signal and apply the pulsed current to an electromagnetic coil surrounding the one or more magnetic structures; and adjust a remanent magnetization of the one or more magnetic structures based on the error signal.

20 Claims, 3 Drawing Sheets

SYSTEM AND METHOD FOR NULLING AMBIENT MAGNETIC FIELDS IN A MAGNETIC SENSOR

TECHNICAL FIELD

The present invention generally relates to magnetometric sensors, and, more particularly, to systems and methods for nulling of ambient magnetic fields in magnetometric sensors.

BACKGROUND

Magnetic sensors play an important role in a variety of applications where the detection of extremely small magnetic signals is essential. Superconducting Quantum Interference Devices (SQUIDs) and Rydberg cells have gained prominence due to their high sensitivity and low noise characteristics. These quantum-effect based magnetometers exhibit a useful dynamic range, spanning from the noise floor to the field strength that would otherwise saturate the sensor. However, a significant challenge arises when these highly sensitive devices encounter ambient magnetic fields, particularly the terrestrial magnetic field. Saturation by such external magnetic fields results in a loss of sensitivity and linearity in the sensor output. Notably, the saturation field densities of these quantum-effect based magnetometers are many orders of magnitude below the strength of the terrestrial magnetic field.

Current approaches often involve the implementation of feedback systems to detect ambient magnetic fields. A typical strategy employs a Proportional-Integral-Derivative (PID) feedback amplifier driving magnetic coils to counteract the magnetic field of the Earth, allowing the sensor to operate in a condition of zero net field. While these methods yield effective results, active means for cancelling the effects of the terrestrial magnetic field introduces system noise through Johnson noise in the electronic circuits of the feedback circuitry, creating current noise in the field nulling coils. There is therefore a need to develop systems and methods to cure the above deficiencies.

SUMMARY

A system is disclosed in accordance with one or more embodiments of the present disclosure. In embodiments, the system includes a magnetic sensor configured to detect an ambient magnetic field. In embodiments, the system includes one or more magnetic structures positioned proximate to the magnetic sensor. In embodiments, the system includes a controller communicatively coupled to the magnetic sensor, the controller including one or more processors configured to execute program instructions stored in memory, the program instructions configured to cause the one or more processors to: receive at least one signal, via the magnetic sensor, the at least one signal associated with a strength of the detected magnetic field; compare the strength value of the at least one signal to a linear range associated with the magnetic sensor; generate an error signal in response to the at least one signal approaching one or more extreme values within the linear range, the error signal configured to indicate how far the strength value of the at least one signal is from a desired range; generate a pulsed current based on the generated error signal, the pulsed current applied to an electromagnetic coil surrounding the one or more magnetic structures; and adjust a remanent magnetization of the one or more magnetic structures based on the generated error signal.

A method is disclosed, in accordance with one or more embodiments of the present disclosure. In embodiments, the method may include, but is not limited to, positioning one or more magnetic structures proximate to a magnetic sensor, the magnetic sensor configured to detect an ambient magnetic field. In embodiments, the method may include, but is not limited to, receiving at least one signal, via the magnetic sensor, the at least one signal associated with a strength of the detected magnetic field. In embodiments, the method may include, but is not limited to, comparing the strength value of the at least one signal to a linear range associated with the magnetic sensor. In embodiments, the method may include, but is not limited to, generating an error signal in response to the at least one signal approaching one or more extreme values within the linear range, the error signal configured to indicate how far the strength value of the at least one signal is from a desired range. In embodiments, the method may include, but is not limited to, generating a pulsed current based on the generated error signal, the pulsed current applied to an electromagnetic coil surrounding the one or more magnetic structures. In embodiments, the method may include, but is not limited to, adjusting a remanent magnetization of the one or more magnetic structures based on the generated error signal.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
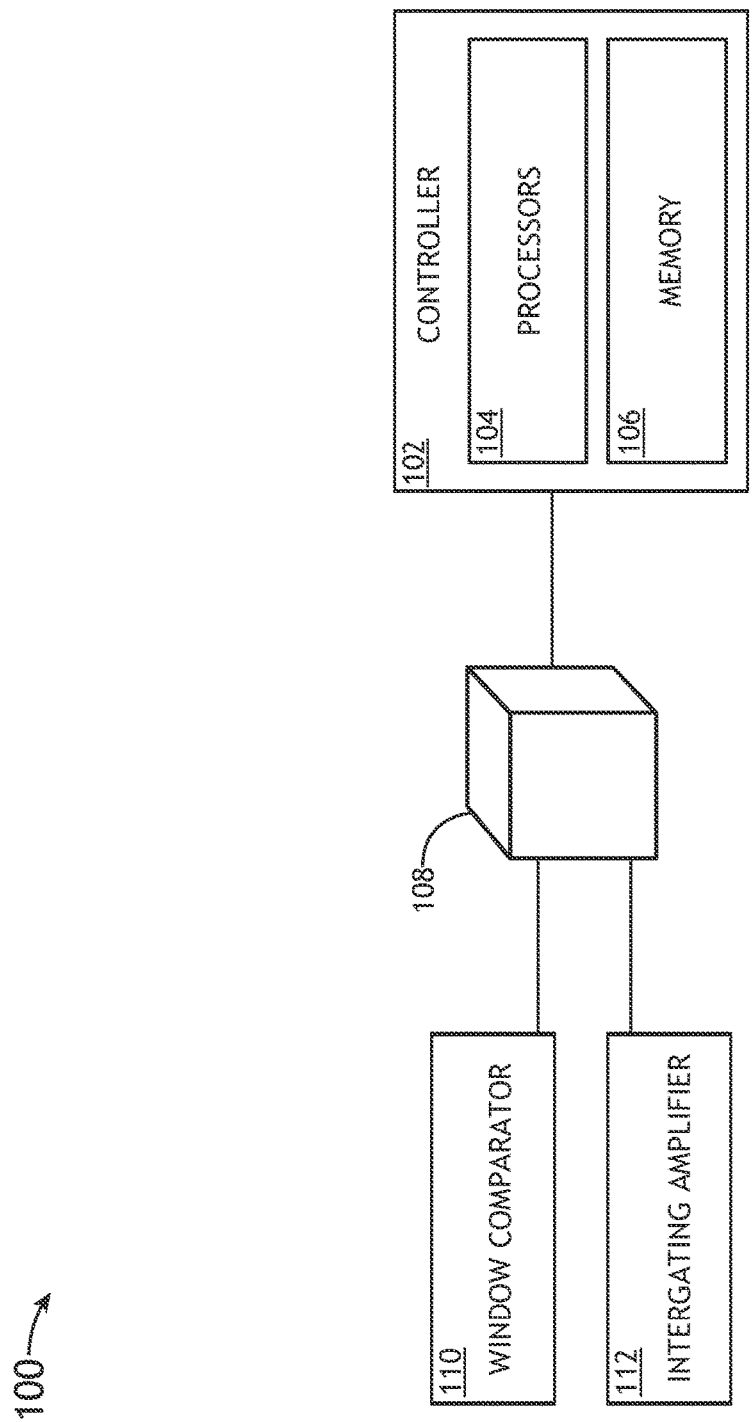
FIG. 1 illustrates a simplified block diagram of a system for nulling of an ambient magnetic field, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

Figure 2:
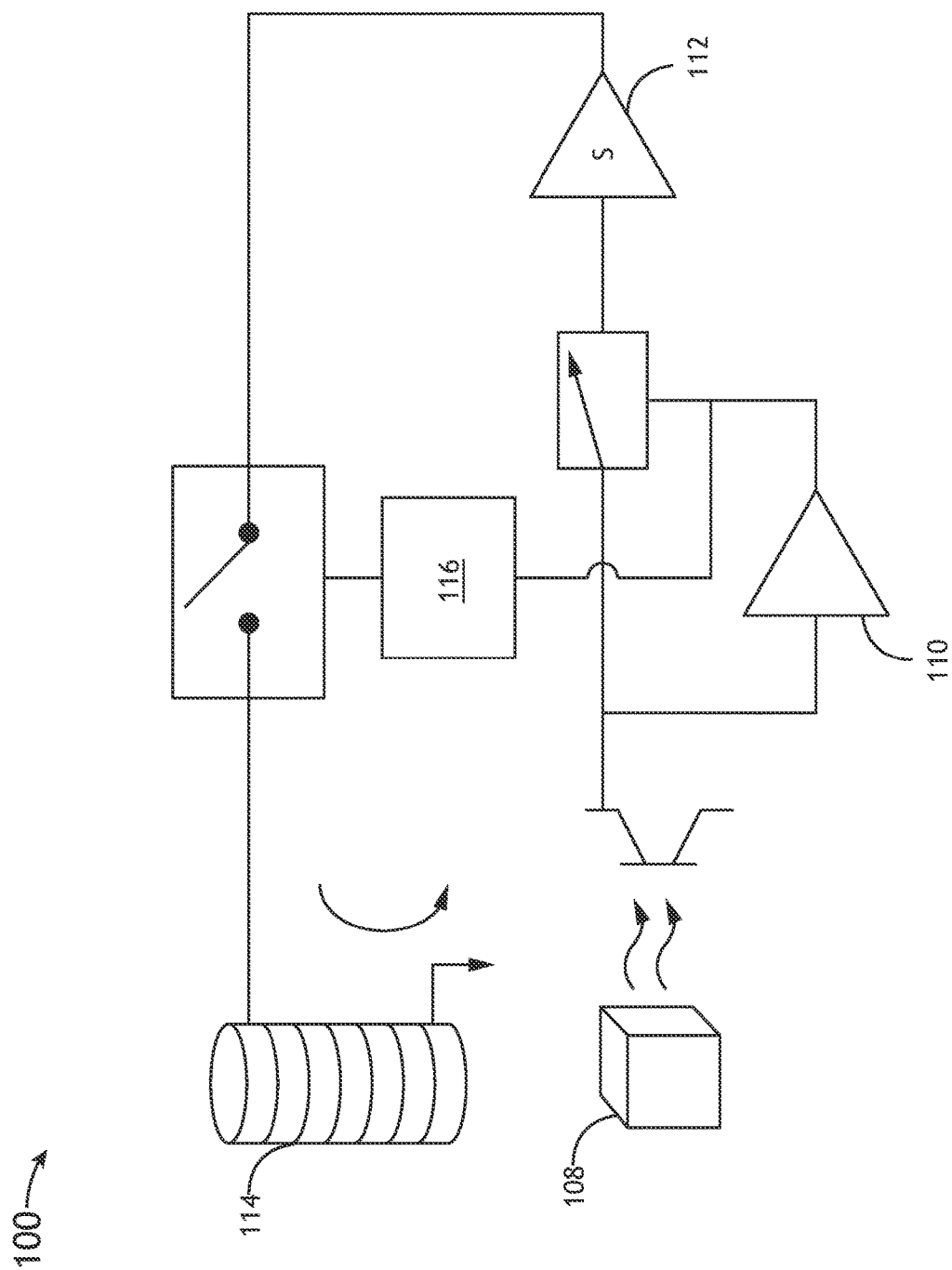
FIG. 2 illustrates a conceptual view of the system for nulling of an ambient magnetic field, in accordance with one or more embodiments of the disclosure.
Figure 3:
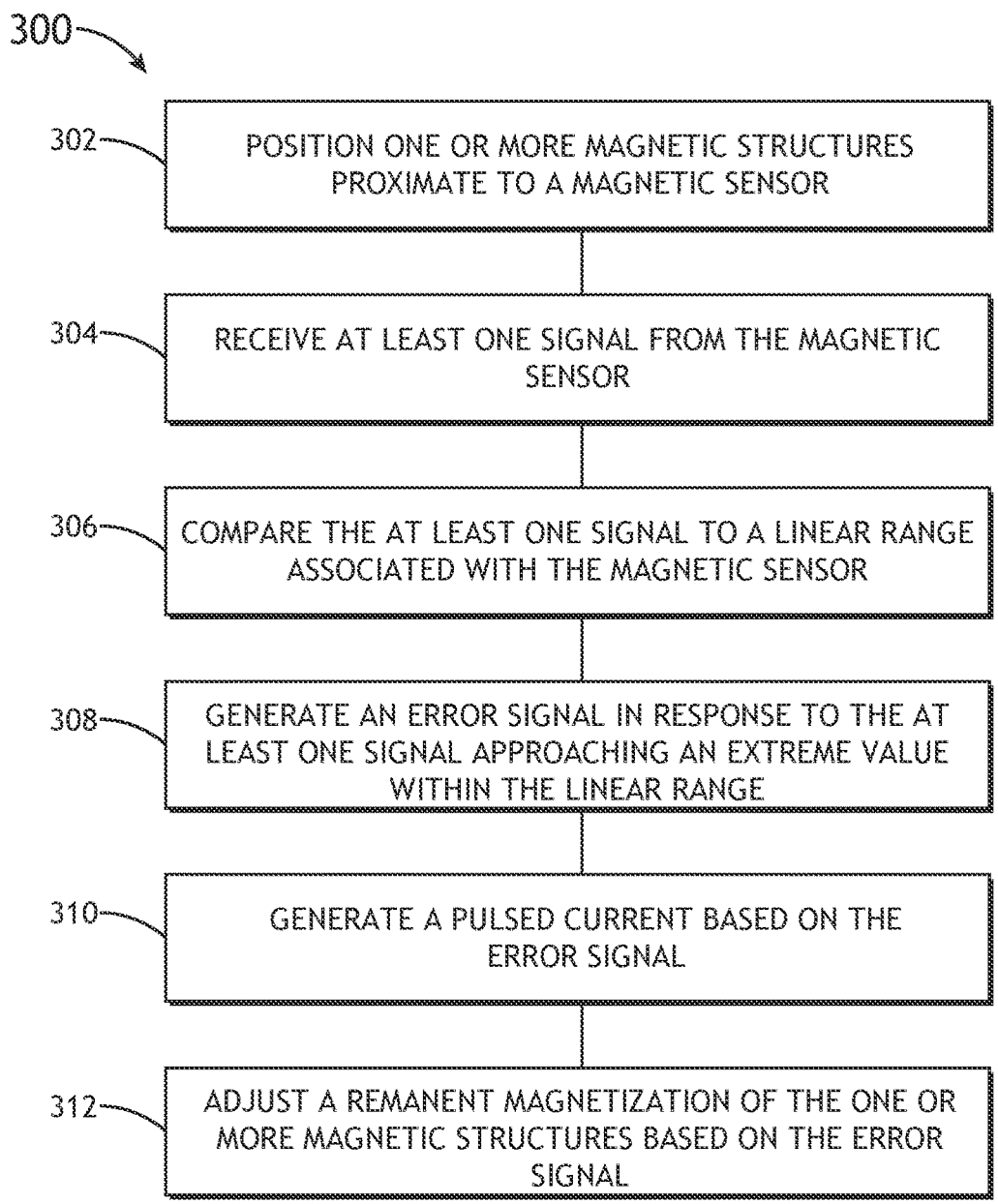
FIG. 3 is a flow diagram depicting a method for nulling of an ambient magnetic field, in accordance with one or more embodiments of the disclosure.

FIGS. 1-3, in general illustrate a system and method for nulling ambient magnetic fields in a magnetic sensor, in accordance with one or more embodiments of the disclosure.

Quantum-based magnetic sensors exhibit remarkable sensitivity, capable of detecting femtotesla magnetic fields. However, these magnetic sensors are often saturated in nanotesla fields, rendering them ineffective against the Earth's millitesla-strength magnetic field. Moreover, employing active field nulling techniques, such as electromagnet field sources, introduces additional noise to the system due to thermal Johnson noise in the coil driving electronics.

As such, it would be desirable to provide a system and method for nulling ambient magnetic fields, such as the terrestrial magnetic field, within magnetic sensors. In some embodiments, the system includes programmable permanent magnets positioned within a proximity to the magnetic sensor and magnetized in a controlled manner to generate fields that precisely counteract and nullify the terrestrial magnetic field. For example, pulsed currents may be applied through electromagnet coils surrounding the programmable magnets. Once the desired fields are attained, the electromagnet drive circuits may be disabled to prevent any further noise from entering the system. This approach not only reduces the power consumption of the system but also diminishes the noise floor of the magnetic sensor.

FIGS. 1-2 illustrate perspective views of a system 100 for nulling ambient magnetic fields, in accordance with one or more embodiments of the present disclosure.

In embodiments, the system 100 includes at least one magnetic sensor 108 (e.g., magnetometer), such as a superconducting quantum interference device (SQUID) or a Rydberg cell, configured to detect an ambient magnetic field. For example, the ambient magnetic field may include a terrestrial magnetic field. It is noted herein that optimizing the performance of magnetometers under the influence of the Earth's geomagnetic field is generally discussed in Xu, et al., "Multi-Parameter Optimization of Rubidium Laser Optically Pumped Magnetometers with Geomagnetic Field Intensity," *Sensors* 2023, 23, 8919, which is incorporated herein by reference in the entirety.

In embodiments, the magnetic sensor 108 is configured to output at least one signal. For example, the output of the magnetic sensor 108 may include an electrical signal that is proportional to the strength of the magnetic field it is exposed to. By way of another example, the signal may include a voltage, current, resistance variation, or the like.

In embodiments, the system 100 may include one or more magnetic structures 114 positioned proximate to the magnetic sensor 108. For example, the one or more magnetic structures 114 may include a ferromagnetic material having a magnetic hardness and remanent flux density. Further, the one or more magnetic structures 114 may be arranged in a fixed orientation and location relative to the magnetic sensor 108. By way of another example, the one or more magnetic structures 114 may include a programmable permanent magnetic source 114. It is noted herein that the one or more magnetic structures 114 may be configured to nullify the terrestrial magnetic field within the magnetic sensor 108 without introducing additional noise to the magnetic sensor 108.

In embodiments, the system 100 includes a controller 102 communicatively coupled to the magnetic sensor 108 and/or one or more additional components of the system 100. The controller 102 may include one or more processors 104 and a memory 106.

In embodiments, the one or more processors 104 of the controller 102 are configured to receive the at least one signal from the magnetic sensor 108. For example, the at least one signal may be associated with a strength of a detected ambient magnetic field.

In embodiments, the one or more processors 104 are configured to compare the strength of the detected magnetic field to a linear range associated with the magnetic sensor 108. For example, the comparison may be performed by a window comparator 110 communicatively coupled to at least one of the one or more processors 104 and the magnetic sensor 108. By way of another example, the linear range of the magnetic sensor 108 may refer to an operating range where the magnetic sensor 108 can provide accurate and linear measurements without saturation. Saturation may occur when the magnetic field strength exceeds a certain threshold value, causing the at least one signal of the magnetic sensor 108 to stop responding linearly.

In embodiments, the one or more processors 104 are configured to generate an error signal in response to the output signal approaching either extreme of the linear range of the magnetic sensor 108. For example, the error signal may indicate how far the strength value of the output signal is from a desired range. The error signal may further trigger an integrating amplifier 112, which is configured to accumulate and integrate the error signal over time. Further, the integrating amplifier 112 may be configured to provide an output that is proportional to the integrated error signal.

In embodiments, the one or more processors 104 are configured to generate a pulsed current based on the output of the integrating amplifier 112. For example, a larger integrated error signal may lead to a larger current pulse. The output of the integrating amplifier 112 may be used to control an amplitude of the pulsed current, which is then applied to an electromagnetic coil surrounding the one or more magnetic structures 114.

In embodiments, after applying the pulsed current and adjusting the remanent magnetization of the one or more magnetic structures 114, the at least one signal of the magnetic sensor 108 is remeasured. For example, if the terrestrial magnetic field is not sufficiently nulled, the error signal may trigger the integrating amplifier 112 again, leading to a slightly larger amplitude current pulse in the next iteration. It is noted herein that the integrating amplifier 112 allows the system 100 to adapt and incrementally adjust the magnetization of the one or more magnetic structures 114 based on the error signal data that it receives, ultimately nullifying the effects of the terrestrial magnetic field on the magnetic sensor 108. This process may be repeated until the remanent magnetic field of the one or more magnetic structures 114 sufficiently nulls the ambient magnetic field, causing the output of the sensor 108 to fall within the range of the window comparator 110.

In embodiments, once the output signal of the magnetic sensor 108 falls within the range defined by the window comparator 110, no further current pulses are applied to the programmable magnetizable structures 114. Furthermore, since no current is applied to the electromagnetic coils thereafter, the system 100 operates without introducing magnetic noise into the magnetic sensor 108 due to Johnson noise from the electronics.

It is noted herein that the selection of material for the one or more magnetizable structures 114 may include, but is not limited to, a ferromagnetic material. For instance, the material may possess a degree of magnetic hardness, characterized by a significant remanent flux density that allows it to be magnetized when subjected to a magnetic field exceeding the coercive force of the material.

In some embodiments, the system 100 may incorporate external flux concentrators to focus one or more signals of interest onto the magnetic sensor 108. For example, these external flux concentrators may be constructed from sections of ferromagnetic material with a high length-to-diameter ratio, oriented in alignment with the target magnetic field and terminated near the magnetic sensor 108. By way of another example, the external flux concentrators may comprise a ferrite material, known for high resistivity levels, which contributes to a reduced magnetic Johnson noise. Additionally, if the selected ferrite exhibits magnetic hardness, it may serve a dual purpose by functioning as a permanent magnet. Consequently, the flux concentrator structure may also fulfill the role of a magnetizable device for canceling the effects of the terrestrial magnetic field.

Referring now to FIG. 3, a method or process 300 for nullifying an ambient magnetic field of a magnetic sensor 108 is disclosed, in accordance with one or more embodiments of the disclosure.

In a step 302, one or more magnetic structures 114 may be positioned proximate to a magnetic sensor 108. For example, the one or more magnetic structures 114 may include programmable permanent magnets 114 configured to communicate with one or more components of system 100. By way of another example, the one or more magnetic structures 114 may include an electromagnetic coil configured to surround the one or more magnetic structures 114.

In a step 304, at least one output signal of the magnetic sensor 108 may be received. For example, the one or more processors 104 of the controller 102 may be configured to communicate with the magnetic sensor 108 and receive the at least one signal output. The at least one signal may include an electrical signal that is proportional to the strength of the magnetic field it is exposed to.

In a step 306, the strength of the output signal may be compared to a linear range associated with the magnetic sensor 108. For example, the comparison may be performed by a window comparator 110 communicatively coupled to at least one of the one or more processors 104 or the magnetic sensor 108. For instance, the window comparator 110 may include a window range corresponding to the linear range of the magnetic sensor 108.

In a step 308, an error signal is transmitted to an integrating error amplifier 112 in response to the output signal of the magnetic sensor 108 falling outside the confines of the window range of the window comparator 110. For example, the one or more processors 104 of the controller 102 may be configured to transmit the output signal to the integrating error amplifier 112. In embodiments, the integrating error amplifier 112 is configured to accumulate and integrate the error signal over time. For instance, the integrating amplifier 112 may be configured to provide an output that is proportional to the integrated error signal.

In a step 310, a pulsed current is generated based on the error signal. For example, the one or more processors 104 may cause a pulse generator 116 to generate the pulsed current in proportion to the integrated error signal of the integrating amplifier 112.

In a step 312, a remanent magnetization of the one or more magnetic structures 114 is adjusted. For example, the one or more processors 104 may be configured to adjust the remanent magnetization by applying the pulsed current to the electromagnetic coil surrounding the one or more magnetic structures 114.

In embodiments, the magnetic state of the one or more magnetic structures 114 is incrementally changed. For example, in the intervening period between pulses, the output signal of the magnetic sensor 108 continues to increment or decrement the integrating amplifier 112. For instance, when the magnetic sensor 108 output returns to a level within the confines of the window comparator 110, the pulse generator may be disabled, and no further change of the magnetic state of the magnetic structures 114 is required.

It is noted herein that there is no thermal noise added from the integrating error amplifier 112 or any additional amplifiers used in conjunction with the magnetic sensor 108 since no current is being applied to the electromagnetic coils when the circuit is disabled. As a result, a noise floor output may be determined solely by the sensor 108 and its amplification, rather than the terrestrial field nulling means.

It is further noted herein the method or process 300 is not limited to the steps and/or sub-steps provided. The method or process 300 may include more or fewer steps and/or sub-steps. The method or process 300 may perform the steps and/or sub-steps simultaneously. The method or process 300 may perform the steps and/or sub-steps sequentially, including in the order provided or an order other than provided. Therefore, the above description should not be interpreted as a limitation on the scope of the disclosure but merely an illustration.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system comprising:
a magnetic sensor configured to detect an ambient magnetic field;
one or more magnetic structures positioned proximate to the magnetic sensor; and
a controller communicatively coupled to the magnetic sensor, the controller comprising one or more processors configured to execute program instructions stored in memory, the program instructions configured to cause the one or more processors to:
receive at least one signal, via the magnetic sensor, the at least one signal associated with a strength of the detected magnetic field;
compare the strength value of the at least one signal to a linear range associated with the magnetic sensor;
generate an error signal in response to the at least one signal approaching one or more extreme values within the linear range, the error signal configured to indicate how far the strength value of the at least one signal is from a desired range;
generate a pulsed current based on the generated error signal, the pulsed current applied to an electromagnetic coil surrounding the one or more magnetic structures; and
adjust a remanent magnetization of the one or more magnetic structures based on the generated error signal.

2. The system of claim 1, wherein the one or more magnetic structures are configured to nullify a terrestrial magnetic field within the magnetic sensor.

3. The system of claim 2, wherein the one or more magnetic structures nullify the terrestrial magnetic field without introducing noise to the magnetic sensor.

4. The system of claim 1, wherein the one or more magnetic structures are arranged in a fixed orientation and location relative to the magnetic sensor to nullify the terrestrial magnetic field associated with the fixed orientation and location.

5. The system of claim 1, wherein the steps of comparing the strength value of the at least one signal to the adjusting of the remanent magnetization of the one or more magnetic structures are repeated until the strength value of the at least one signal falls within the desired range.

6. The system of claim 1, wherein the desired linear range is defined by the window comparator.

7. The system of claim 1, wherein the one or more magnetic structures comprise a ferromagnetic material, the ferromagnetic material having a magnetic hardness and remanent flux density.

8. The system of claim 1, further comprising an introduction of eternal flux concentrators having a high length-to-diameter ratio and oriented in a direction facing the magnetic field.

9. The system of claim 1, further comprising an integrating amplifier configured to incorporate a feedback loop having a time constant, and wherein a length of the time constant is determinative of the rate of adjustment of the remanent magnetization of the one or more magnetic structures.

10. The system of claim 1, wherein the comparison of the strength value of the at least one signal and the linear range is performed via a window comparator.

11. A method for nulling ambient magnetic fields comprising:
positioning one or more magnetic structures proximate to a magnetic sensor, the magnetic sensor configured to detect an ambient magnetic field;
receiving at least one signal, via the magnetic sensor, the at least one signal associated with a strength of the detected magnetic field;
comparing the strength value of the at least one signal to a linear range associated with the magnetic sensor;
generating an error signal in response to the at least one signal approaching one or more extreme values within the linear range, the error signal configured to indicate how far the strength value of the at least one signal is from a desired range;
generating a pulsed current based on the generated error signal, the pulsed current applied to an electromagnetic coil surrounding the one or more magnetic structures; and
adjusting a remanent magnetization of the one or more magnetic structures based on the generated error signal.

12. The method of claim 11, wherein the one or more magnetic structures are configured to nullify a terrestrial magnetic field within the magnetic sensor.

13. The method of claim 12, wherein the one or more magnetic structures nullify the terrestrial magnetic field without introducing noise to the magnetic sensor.

14. The method of claim 11, wherein the one or more magnetic structures are arranged in a fixed orientation and location relative to the magnetic sensor to nullify the terrestrial magnetic field associated with the fixed orientation and location.

15. The method of claim 11, wherein the steps of comparing the strength value of the at least one signal to the adjusting of the remanent magnetization of the one or more magnetic structures are repeated until the strength value of the at least one signal falls within the desired range.

16. The method of claim 11, wherein the desired linear range is defined by the window comparator.

17. The method of claim 11, wherein the one or more magnetic structures comprise a ferromagnetic material, the ferromagnetic material having a magnetic hardness and remanent flux density.

18. The method of claim 11, further comprising an introduction of eternal flux concentrators having a high length-to-diameter ratio and oriented in a direction facing the magnetic field.

19. The method of claim 11, further comprising an integrating amplifier configured to incorporate a feedback loop having a time constant, and wherein a length of the time constant is determinative of the rate of adjustment of the remanent magnetization of the one or more magnetic structures.

20. The method of claim 11, wherein the comparison of the strength value of the at least one signal and the linear range is performed via a window comparator.

* * * * *